United States Patent

[11] 3,561,487

| [72] | Inventor | Thomas G. Reed, Jr. |
| | | 818 Heather Court, Houston, Tex. 77024 |
| [21] | Appl. No. | 605,785 |
| [22] | Filed | Dec. 29, 1966 |
| [45] | Patented | Feb. 9, 1971 |

[54] ROTARY VALVE WITH SNAP RING CONNECTOR
6 Claims, 3 Drawing Figs.

[52] U.S. Cl. ................................................. 137/625.32,
251/310, 251/345, 251/339
[51] Int. Cl. ................................................. F16k 5/18,
F16k 11/07
[50] Field of Search ........................................ 251/345,
341, 343, 310, 339; 137/625.32

[56] References Cited
UNITED STATES PATENTS
1,240,161 9/1917 Olds ............................ 251/345
2,766,005 10/1956 Fischer et al. ................ 251/310

FOREIGN PATENTS
1,299,762 6/1962 France ......................... 251/310
976,585 11/1964 Great Britain ................ 251/310

Primary Examiner—Arnold Rosenthal
Attorney—G. Baxter Dunaway

ABSTRACT: A rotary valve having an inner cylindrical sleeve, an outer cylindrical sleeve in sealing contact with the inner sleeve, the inner sleeve being closed by a wall closure at one end, and openings in the sleeve surfaces to allow liquids to enter the chamber inside the inner sleeve and exit through the open end of the inner sleeve. The valve is provided with elements to prevent longitudinal movement of the sleeves, an element to rotate the openings into and out of coincidence, and a snap-ring-flange combination to facilitate engagement with a containing surface.

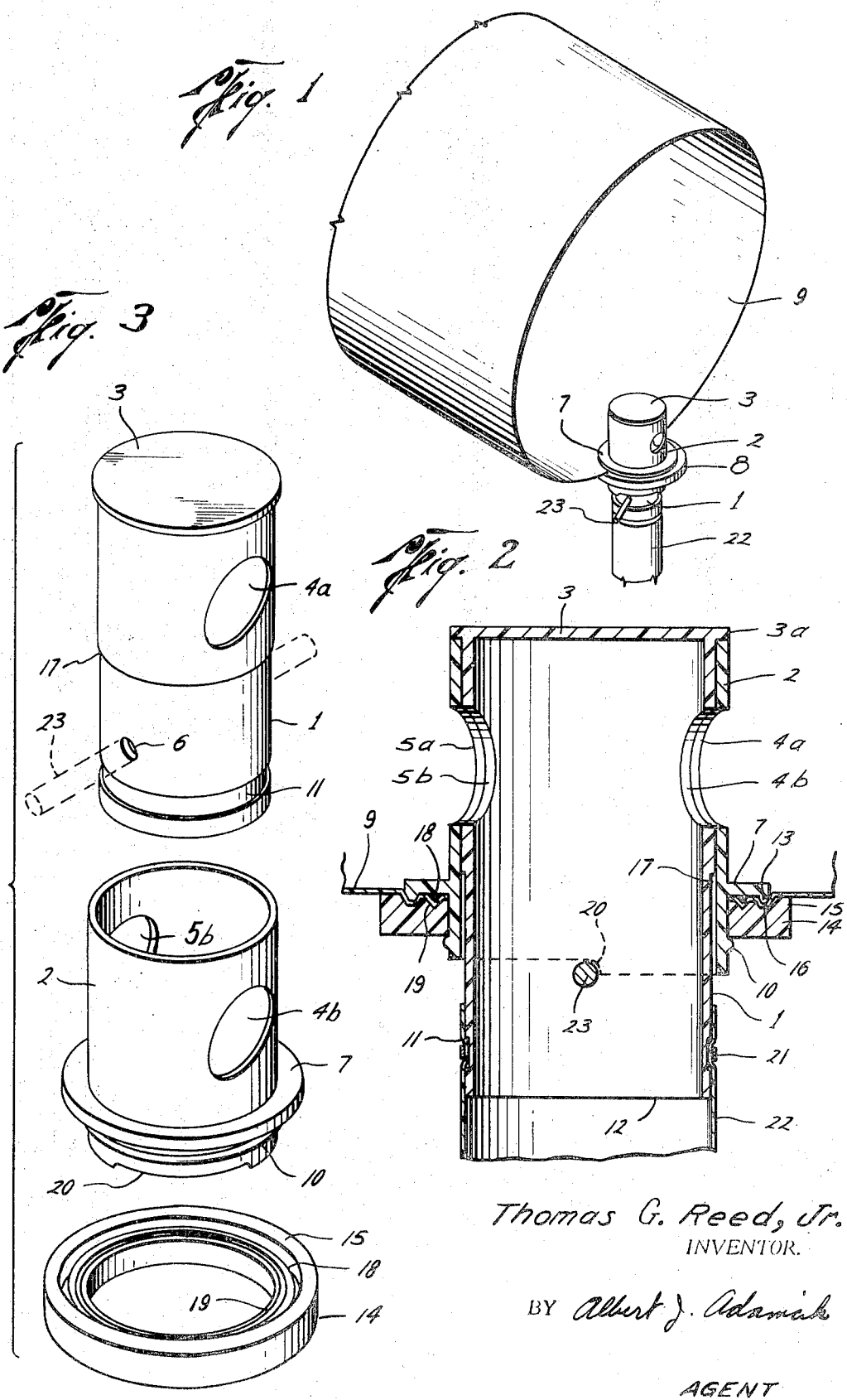
Thomas G. Reed, Jr.
INVENTOR.
BY Albert J. Adamick
AGENT

ROTARY VALVE WITH SNAP RING CONNECTOR

The invention relates to an improved valve, and especially to an improved valve for use in plastic tubing. More particularly, the invention relates to a valve suitable for use in gated plastic irrigation tubing.

The primary object of the invention is to provide an improved rotary valve which operates efficiently and is easily installed within a fluid-containing surface or tubing. A further object is to provide an improved rotary valve which, in addition to the advantages mentioned above, is easily made by injection molding of a plastic material such as polyethylene, polypropylene, etc., at relatively low cost.

FIG. 1 shows a rotary valve according to the invention in its operating position partially enclosed in a large segment of flexible tubing and connected to a smaller distribution segment.

FIG. 2 shows an embodiment according to the invention in which a special type of snap ring is utilized.

FIG. 3 shows an assembly view of the valve of the invention.

Referring more particularly to the drawings, the invention comprises a complete valve unit comprising an inner cylindrical sleeve 1 and an outer cylindrical sleeve 2, which surrounds and covers the greater portion of sleeve 1. Inner cylindrical sleeve 1 is closed by an integral wall closure 3 at one end, the wall closure extending beyond the outer diameter of sleeve 1 and forming an integral flanged extension 3a of elements 1 and 3. This flange element 3a, indicated in the drawing, serves as a means for preventing longitudinal movement in one direction between elements 1 and 2. Openings 4a and 4b are provided in outer cylindrical member 2 and inner cylindrical member 1 respectively to permit fluid to enter the chamber inside inner cylindrical sleeve 1 and pass out the open end of sleeve 1 and 12. More than one pair of openings for liquid entry may be provided and an advantageous arrangement is to provide diametrically opposed openings in both outer cylindrical sleeve 2 and in inner cylindrical sleeve 1, as for example, openings 5a and 5b in FIG. 2. The dimensions of outer cylindrical sleeve 2 and inner cylindrical sleeve 1 are regulated so that there is a sealing relationship between the two at least over a portion of their concentricity, that is to say, the sealing relationship should be either that of an interference fit or of a close fit utilizing a suitable lubricant to aid in the sealing. This may be accomplished in a variety of ways, e.g., by maintaining the size of the outer diameter of the inner cylindrical sleeve of such magnitude over the greater portion of the sleeves' concentricity so as to get the desired fit (as shown), or may be accomplished by suitable ridges or lips on the outer surface of inner cylindrical sleeve 1 around the openings 4a, 4b, 5a and 5b (not shown). Inner cylindrical sleeve 1 is rotated relative to outer cylindrical sleeve 2 by a lever arm or rod 23 positioned at 6. Rod 23, in conjunction with groove 20, also serves to prevent longitudinal movement of sleeves 1 and 2, although other means for preventing longitudinal movement may be provided if desired. Outer cylindrical sleeve 2 is provided with an integral circumferential extension or flange 7 which serves as an engagement surface for the containing surface with which the valve is to be used. Snap ring 8 may be used to seal container or containing surface 9 against flange 7. Projection 10 seats the snap ring 8 and provides better holding power on the outer cylindrical sleeve 2. A groove 11 is provided to enhance the holding of tubing attached to 1.

FIG. 2 illustrates a preferred embodiment of the invention. Although a variety of snap ring and flange sealing combinations may be used, as shown in FIG. 1, the combination as shown in elements 7, 13, 14, 15 and 16 provides a particularly effective unit. The flange 7 contains a projection 13 which fits groove 16 of the snap ring 14. The holding power of the combination is further enhanced by the extension of the snap ring, as indicated at 15, to the other side of flange 7. A ridge and groove combination 18 and 19 may be added to increase gripping power. The annular integrally constructed lip 10 on outer sleeve 2 aids in positioning and holding the snap ring 14. In this embodiment, the outer diameter of inner cylindrical sleeve 1 is in sealing contact with the inner surface of outer cylindrical sleeve 2 over a major portion of the length of sleeve 1. The reduction of the outer diameter of the cylindrical sleeve 1 in the vicinity of flange 7 aids in turning the members 1, 2, which otherwise are somewhat difficult to turn where the sealing engagement extends over a large portion of the length of the sleeve 1. The reduction is exaggerated in the drawing in order to show effectively its presence.

For service, the body portion of the valve is inserted in an opening in a flexible containing surface, such as plastic tubing, and the opening in the tubing is stretched to allow positioning of the flange portion 7 of the outer cylindrical sleeve inside the tubing. The snap ring 7 or 14 is then mounted and compressed into place and the valve is ready for operation. The unit is operated simply and easily by operating lever arm 23 in groove 20 to bring the openings 4a and 4b in and out in coincidence. Liquid entering the valve through the openings passes out through the open end 12 of the inner cylindrical sleeve into tube 22 held in groove 11 by ring 21.

It will be appreciated by those of skill in the art that my improved valve is easily installed and available for use in a minimum amount of time.

While there are above disclosed but a limited number of embodiments of the structure of the invention herein presented, it is possible to produce still other embodiments without departing from the inventive concept herein disclosed, and it is desired therefore that only such limitation be imposed on the appended claims as are stated therein, or required by the prior art.

I claim:

1. A valve comprising a first cylindrical sleeve, having an integral closure wall at one end, and having at least one radial opening for the admission of liquid in the portion of the sleeve adjacent the integral closure wall, a second cylindrical sleeve having at least one radial opening for the admission of liquid, said second cylindrical sleeve being of greater inner diameter than the outer diameter of said first sleeve and surrounding the first sleeve for the greater portion of the length of the first sleeve, there being a sealing fit between said second cylindrical sleeve and said first cylindrical sleeve at least in the portion of the outer surface of the first cylindrical sleeve surrounding each radial opening, means extending from and forming an integral portion of said closure wall of said first cylindrical sleeve for preventing longitudinal movement between said first sleeve and said second sleeve in at least one direction, but allowing relative rotary movement between said first cylindrical sleeve and said second cylindrical sleeve, means for rotating said first sleeve relative to said second sleeve to alternately bring at least one radial opening in said first sleeve and at least one radial opening in said second sleeve into alignment and out of alignment, means forming an integral circumferential portion of said second sleeve for engaging a containing surface in which the valve is to be operated, snap ring means for securing said surface to said means engaging said surface, the portion of the first sleeve adjacent to the area of said second sleeve having said means for engaging the containing surface being of slightly smaller diameter than the outer diameter of the first sleeve in the portion of the sleeve containing the diametrically spaced openings.

2. A valve comprising a first cylindrical sleeve, having an integral closure wall at one end, and having at least one radial opening for the admission of liquid in the portion of the sleeve adjacent the integral closure wall, a second cylindrical sleeve having at least one radial opening for the admission of liquid, said second cylindrical sleeve being of greater inner diameter than the outer diameter of said first sleeve and surrounding the first sleeve for the greater portion of the length of the first sleeve, there being a sealing fit between said second cylindrical sleeve and said first cylindrical sleeve at least in the portion of the outer surface of the first cylindrical sleeve surrounding each radial opening, means extending from and forming an integral portion of said closure wall of said first cylindrical sleeve for preventing longitudinal movement between said first sleeve and said second sleeve in at least one direction, but allowing relative rotary movement between said first cylindrical sleeve and said second cylindrical sleeve, means for rotating said first sleeve relative to said second sleeve to alternately bring at least one radial opening in said first sleeve and at least one radial opening in said second sleeve into alignment and out of alignment, means forming an integral circumferential portion of said second sleeve for engaging a containing surface in which the valve is to be operated, and a snap ring for securing said surface to said means engaging said surface.

3. The valve of claim 2 wherein the snap ring is secured by projection means forming an integral portion of the second sleeve.

4. A valve comprising a first cylindrical sleeve, having an integral closure wall at one end, and having at least one radial opening for the admission of liquid in the portion of the sleeve adjacent the integral closure wall, a second cylindrical sleeve having at least one radial opening for the admission of liquid, said second cylindrical sleeve being of greater inner diameter than the outer diameter of said first sleeve and surrounding the first sleeve for the greater portion of the length of the first sleeve, there being a sealing fit between said second cylindrical sleeve and said first cylindrical sleeve at least in the portion of the outer surface of the first cylindrical sleeve surrounding each radial opening, means extending from and forming an integral portion of said closure wall of said first cylindrical sleeve for preventing longitudinal movement between said first sleeve and said second sleeve in at least one direction, but allowing relative rotary movement between said first cylindrical sleeve and said second cylindrical sleeve, means for rotating said first sleeve relative to said second sleeve to alternately bring at least one radial opening in said first sleeve and at least one radial opening in said second sleeve into alignment and out of alignment, means forming an integral circumferential portion of said second sleeve for engaging a containing surface in which the valve is to be operated, means for securing said surface to said means engaging said surface, the portion of the first sleeve adjacent to the area of said second sleeve having said means for engaging the containing surface being of slightly smaller diameter than the outer diameter of the first sleeve in the portion of the sleeve containing the radial opening.

5. A valve comprising a first cylindrical sleeve, having an integral closure wall at one end, and having at least one radial opening for the admission of liquid in the portion of the sleeve adjacent the integral closure wall, a second cylindrical sleeve having at least one radial opening for the admission of liquid, said second cylindrical sleeve being of greater inner diameter than the outer diameter of said first sleeve and surrounding the first sleeve for the greater portion of the length of the first sleeve, there being a sealing fit between said second cylindrical sleeve and said first cylindrical sleeve at least in the portion of the outer surface of the first cylindrical sleeve surrounding each radial opening, means extending from and forming an integral portion of said closure wall of said first cylindrical sleeve for preventing longitudinal movement between said first sleeve and said second sleeve in at least one direction, but allowing relative rotary movement between said first cylindrical sleeve and said second cylindrical sleeve, means for rotating said first sleeve relative to said second sleeve to alternately bring at least one radial opening in said first sleeve and at least one radial opening in said second sleeve into alignment and out of alignment, flange means forming an integral circumferential portion of said second sleeve for engaging a containing surface in which the valve is to be operated, a snap ring for securing said surface to said means engaging said surface, said snap ring being secured by projection means forming an integral portion of the second sleeve, and said flange means having an annular projection at about the outer extremity of said flange means, said projection corresponding to an annular groove in said snap ring.

6. The valve of claim 5 wherein the flange means has an additional annular projection which corresponds to an additional annular groove in said snap ring.